S. L. FOX.
TUBE-PACKING.
No. 7,479. Reissued Jan. 30, 1877.
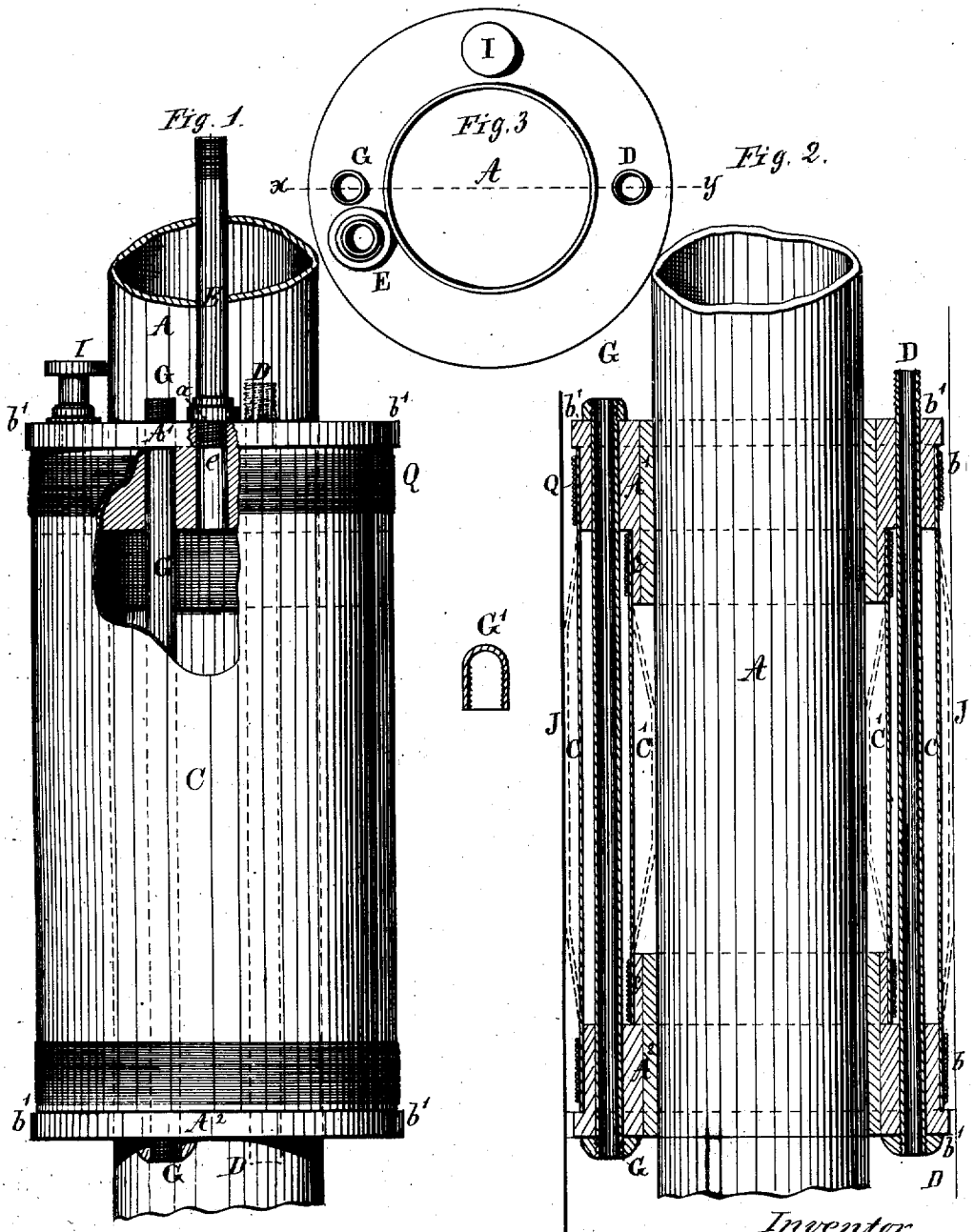
Witnesses
Henry Orth
H. A. Bliss
Inventor
Samuel L. Fox
per
W. A. Doubleday
atty

UNITED STATES PATENT OFFICE

SAMUEL L. FOX, OF PHILADELPHIA, PENNSYLVANIA, ASSIGNOR TO HENRY H. DOUBLEDAY.

IMPROVEMENT IN TUBE-PACKING.

Specification forming part of Letters Patent No. 45,822, dated January 10, 1865; reissue No. 7,479, dated January 30, 1877; application filed December 8, 1876.

*To all whom it may concern:*

Be it known that I, SAMUEL L. FOX, of Philadelphia, in the county of Philadelphia and State of Pennsylvania, have invented a new and useful Improvement in Devices for Packing the Tubes of Oil and other Deep Wells, which improvement is fully set forth in the following specification, reference being had to the accompanying drawings, in which—

Figure 1 is an elevation of my improvement, a part of the shell or walls being broken away. Fig. 2 is a vertical section taken on line *x y*, Fig. 3; and Fig. 3 is a plan view.

Similar letters of reference indicate like parts in all the figures.

The invention relates to the construction and combination of a packer and three tubes within the walls of a well, one of these tubes being the tube through which the oil is discharged from the well.

One feature of the invention is the employment of metal flanges, which surround this discharging-tube and are provided with seats for the supplemental tubes.

My invention is especially adapted for packing a tube in an oil-well where pumping-tubes of great length are employed.

In operating such wells, it is usually necessary or desirable to cut off the flow of surface and spring water from the oil or other substance which is to be raised from the bottom of the well. Heretofore this has generally been done by the use of a "seed-bag" applied to the pump-tube at a point below the lowest vein or other source of fresh water. The seed-bag is very imperfect in its operation, and is attended with several disadvantages. For instance, when it becomes necessary to take out the pump-tube for repairs or otherwise, it results in the destruction of the packer, because it is impossible to remove the seed-bag before taking out the tubing, in addition to which the pump-tube is sometimes broken, owing to the enormous weight of water and other material which it has to lift.

My invention consists further in certain details of construction, which will be explained.

In the accompanying drawings, J J represent the sides or walls of an oil-well or artesian well. A is a pump-tube sunk therein. Q is a hollow air-tight case, made partly of metal or its equivalent, and partly of flexible or elastic material.

The ends of the case are metallic rings or sections of hollow cylinders $A^1$ $A^2$ of an interior diameter a little greater than the exterior diameter of the pump-tube, and connected with each other by means of an inner central cylindrical section made of an elastic or flexible material, *c c'*, whose opposite ends are joined to the end section $A^1$ $A^2$. Both of these end sections are made substantially alike, being turned down upon the ends which face each other, so as to form collars or flanges *c*, about which the central section C' is fitted, and to which it is secured by being wound with wire or other suitable means. Both cylinders are also turned down near their ends, as at *b*, to receive an outer central cylinder, C, which is secured in a similar manner, being so fitted as that the binding-wire is protected from abrasion by the projecting flanges *b* formed upon the outer ends of the cylinder $A^1$ $A^2$.

D G are small tubes or pipes passing through holes in the flanges $A^1$ $A^2$, and also through the annular space between the flexible sides C C' of the packing-case. Either or both of them may be made to prevent the undue spreading apart of the flanges $A^1$ $A^2$. Such nuts are shown at D' D' G', and when the nut G' is used the end of the tube to which it (nut G') is applied will be thereby closed.

One of these pipes may be made to serve as a support to maintain the packer in position until its sides are expanded, as will be hereinafter explained, or to withdraw it (the packer) from the well.

Near the tube G in ring $A^1$ is a screw-threaded hole to receive pipe E, which is also clamped to the ring $A^1$ by means of a nut, *a*. The pipe E may be screwed into the ring the whole length of the hole *e*, or only so far as will give sufficient strength to the joint. This pipe communicates with the annular space between the cylinders C C', and is continued up to the top of the well.

It will be seen that the pipe or tube D performs the office of a stay-bolt to the rings $A^1$ $A^2$ upon one side of the packer.

When desired, the tube G may be dispensed with, and if it be then found necessary to employ some means to support the rings or flanges $A^1$ $A^2$ against the tendency to spread from each other, the pipe E may be extended through both flanges in substantially same manner as the tube D does; but in such case the pipe E must have openings in it at some point between the flanges, in order that water may pass from the pipe into the annular space between the flexible cylinder.

In practice, however, it will generally be found preferable to use the three tubes D and G (extending through the packer) and E.

There is a perforation made through the upper ring into the annular space, for the purpose of a vent to said space, if found necessary. This hole is closed by a screw-plug, I, or by any other suitable device.

The mode of using and operating this packer is as follows: The place in the well—or, in other words, the depth at which the pump-tube is to be packed—being known or ascertained by the usual means, the case is placed around the tube and lowered by means of the pipes D and E, which are to be lengthened by successive additions until the case reaches the required depth.

It is then filled with water or other liquid (if not filled before it is lowered) through the pipe E by means of a pump or otherwise, so as to produce a pressure sufficient to expand the sides of the cylinder, as shown in Fig. 2, the outer cylinder C being held firmly against the sides of the well, and the inner cylinder being held in like manner against the outside of the pump-tube.

Air or any other suitable fluid may be used for this purpose instead of water or other liquid.

A pressure-gage may be connected with the pipe E at the top of the well to indicate the pressure which is being applied to the sides of the case.

When the pump-tube is to be removed from the well for any purpose the packing-case is to be emptied of its contents, so far as to permit its flexible sides to collapse, when it can be raised from the well by means of the pipes D and E, the superincumbent water previously held up by the packer escaping past its sides into the well.

When the packing-case has been removed the pumping-tube can be easily taken out, and as it is important that the surface and other water and foreign substances should be excluded from the well while the pumping-tube is out. I, after taking out such tube, sink a section of tubing of about the same diameter a sufficient distance down the well, and pack it in the same manner as I pack the pump-tube, thereby preserving the well from being obstructed or overflowed while the pump is out.

This mode of packing may be used with good results in the case of any surface or joint which may be inaccessible to ordinary manipulation. The case may be adapted for use in different situations by changing its form, and one or both sides may be made expansible, as occasion may require.

By the use of a metal packing-ring or flange surrounding the pump-tube, and supporting the packer upon such flange or flanges, I am enabled to use two or more supplemental tubes in addition to the pump-tube, and pack them all tightly against the inflow of water to the lower part of the well; and it will be noticed that the packer is arranged below the flange $A^1$, and is supported by the flanges independently of the pump-tube, and that the flange $A^1$ has a screw-threaded seat to receive the tube E.

What I claim is—

1. In an oil-well the combination of a discharging-tube, a packer, and two supplemental tubes, provided at their upper ends with screw-threads.

2. In an oil-well the combination, with the discharging-tube, of a flange surrounding the tube, and provided with a seat adapted to receive and support an upwardly-extending removable supplemental pipe, substantially as set forth.

3. An oil-well packer, consisting of two rims or flanges, and a flexible or elastic packing material, arranged between the flanges, and adapted to be compressed against the wall of the well, and also against an inner tube.

SAMUEL L. FOX.

Witnesses:
JNO. E. SWINBURNE,
G. ARTHUR BILLSON.